UNITED STATES PATENT OFFICE 2,210,319

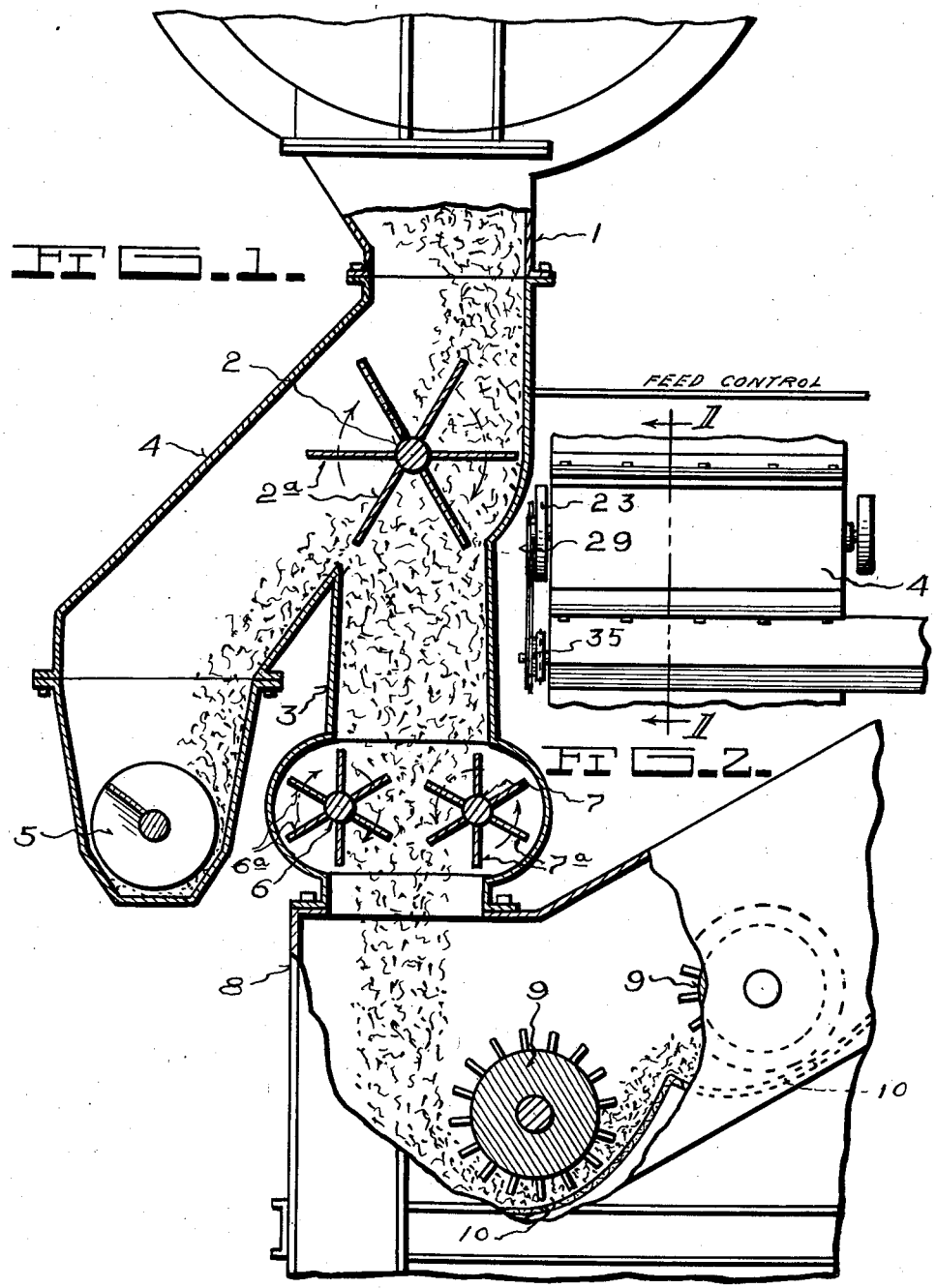

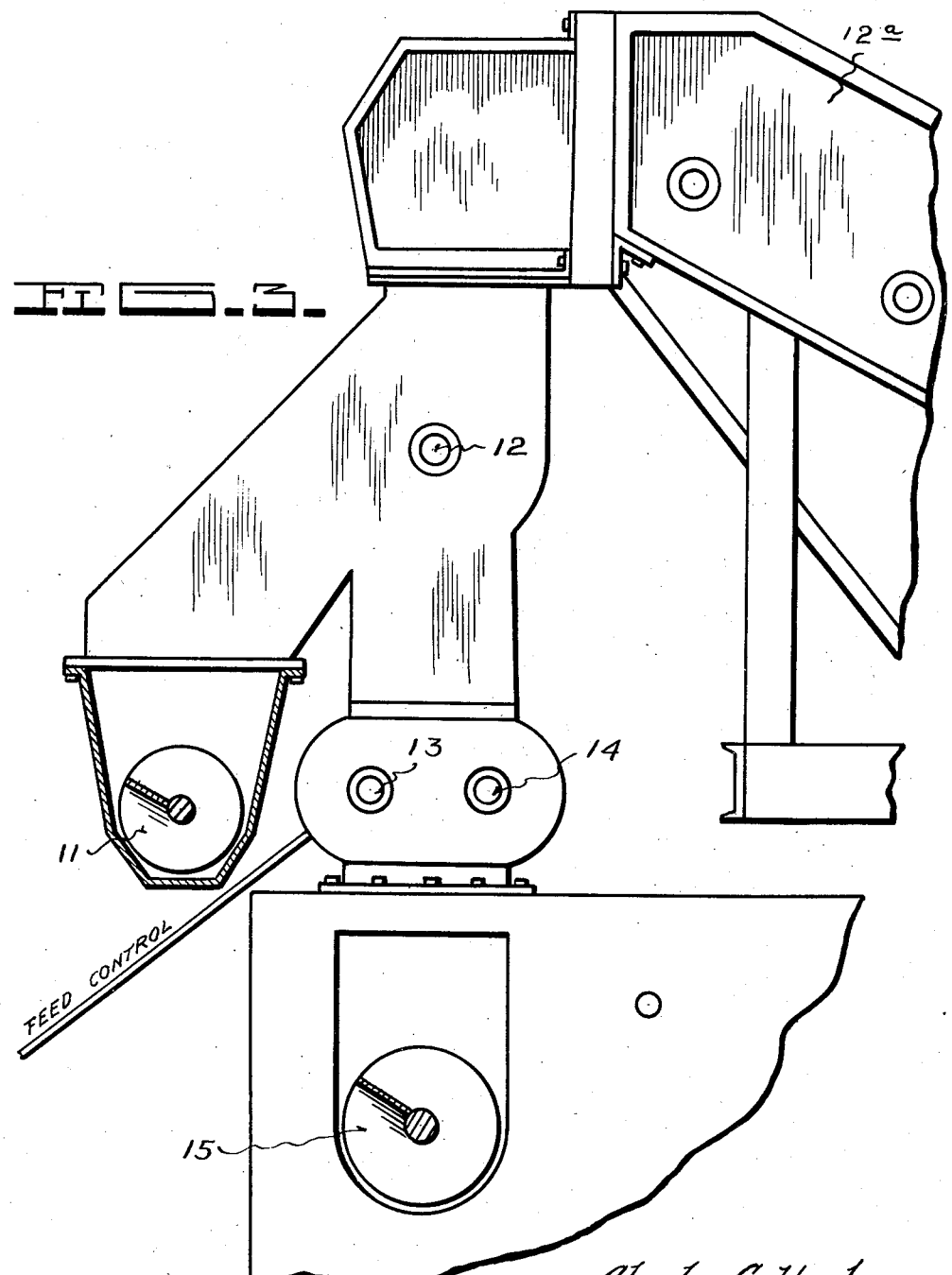

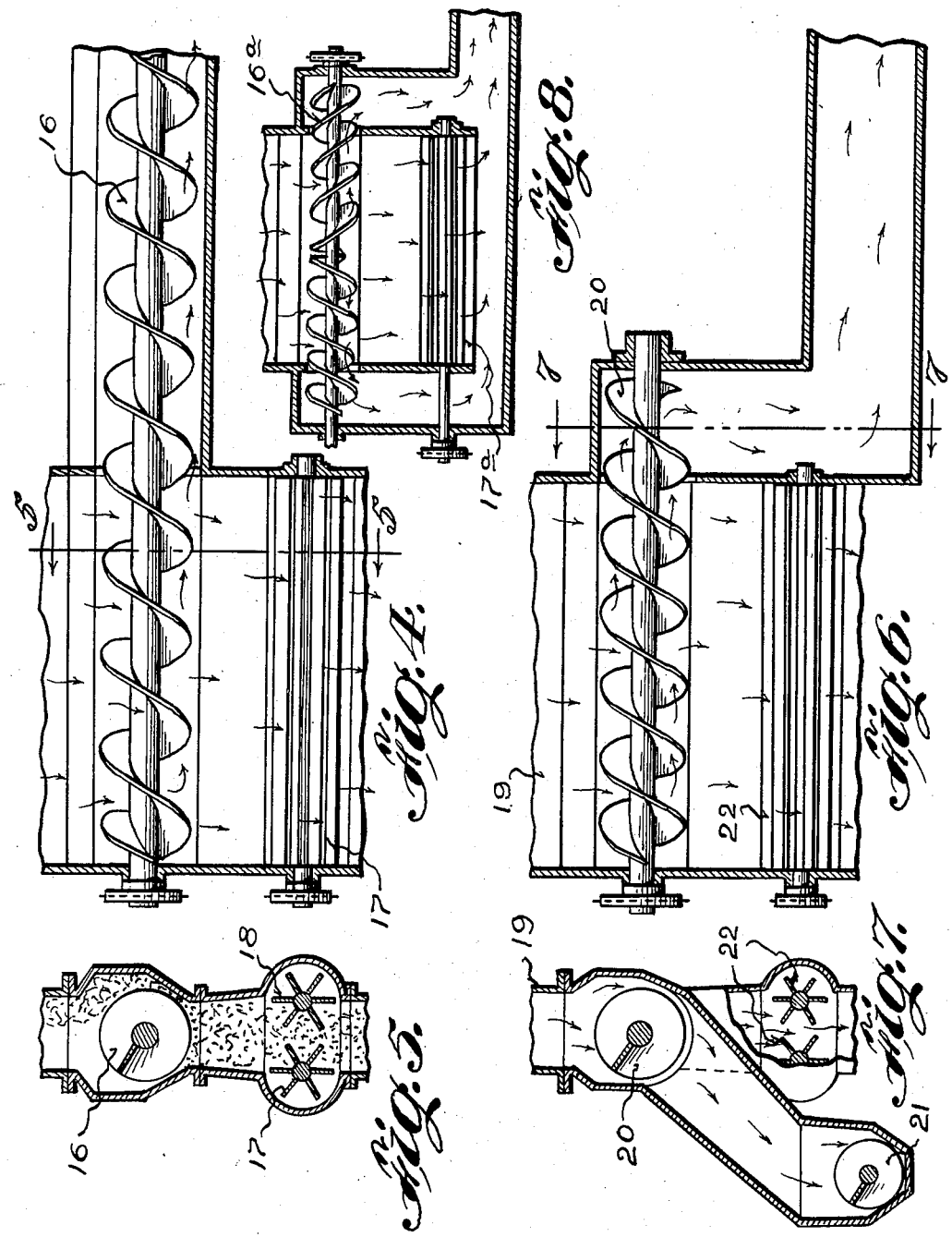

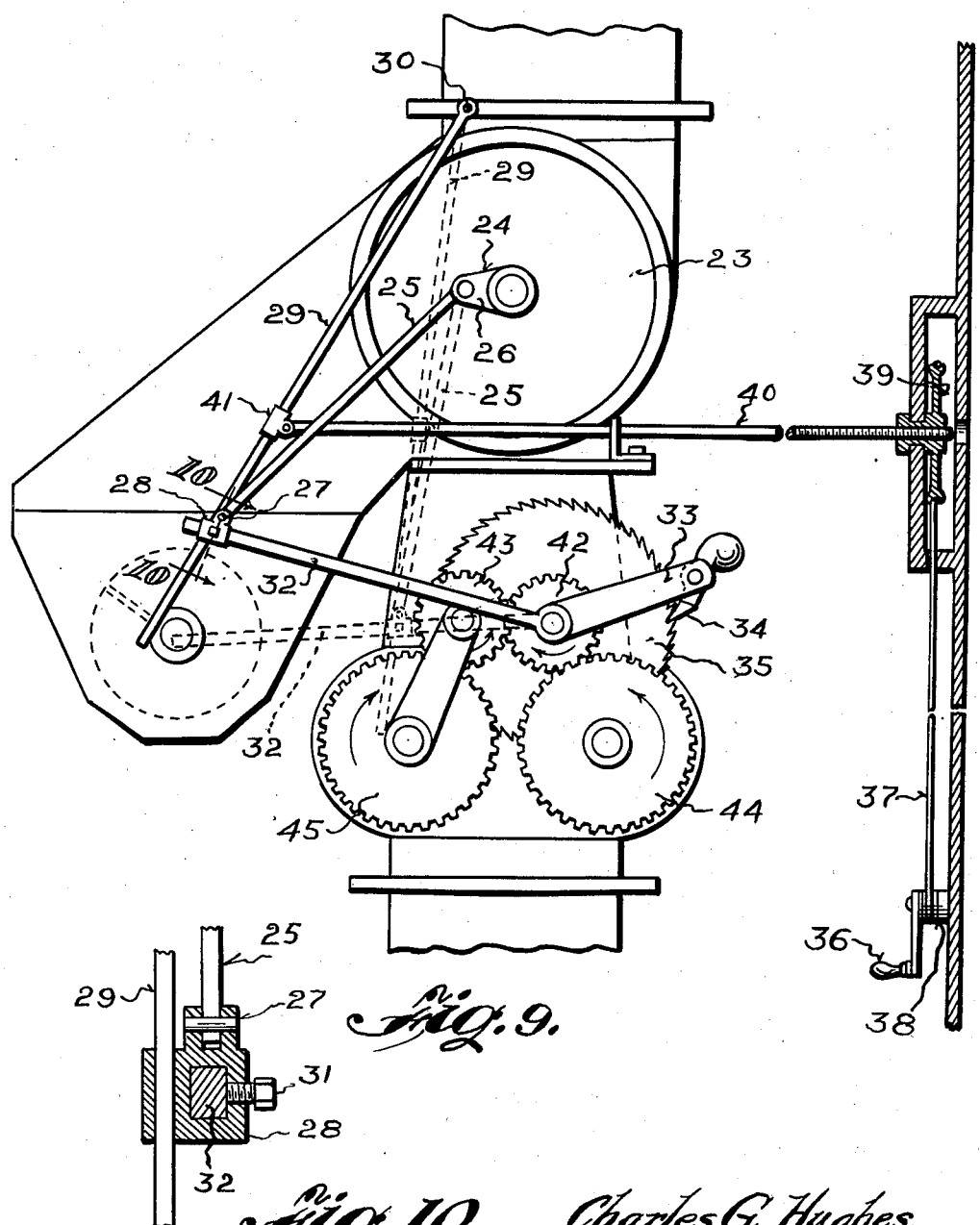

APPARATUS FOR CONDITIONING COTTON

Charles G. Hughes, Wichita Falls, Tex., assignor to Biggs and Company, Wichita Falls, Tex., a corporation of Texas Application March 30, 1939, Serial No. 264,959

3 Claims. (Cl. 19—67)

This invention relates to a method and apparatus for conditioning cotton in a cotton ginning outfit, and it has particular reference to the processing of the seed cotton while being handled by the overhead cleaners and master bur extractors which process the cotton before it is delivered to the distributor in a standard cotton ginning outfit.

The principal object of the invention is to provide a method and apparatus whereby only the amount or volume of cotton being processed by the gin stands during a given time is permitted to be handled by the overhead cleaners and master bur extractor.

Another object of the invention is to provide means to deflect or by-pass or overflow the surplus cotton and burs that are fed through the separator in addition to the amount that is permitted to enter the over-head cleaner.

Yet another object is to provide an apparatus which when placed after the cleaner and over the master bur extractor will permit only the desired amount of cotton and burs to go through the machine to the master bur extractor or overhead bur extractor and will deflect or by-pass the surplus cotton and burs to a suitable storage.

Still another object of the invention is to provide a mechanism whereby an operator of a gin outfit is enabled to run the mechanism faster or slower as desired to effect the proper flow in proportion to the amount required, which rate should manifestly be varied to handle the different classes of cotton.

A still further object is to provide an apparatus of the character to be hereinafter described and which apparatus may be readily installed to operate in conjunction with a conventional gin outfit, and which apparatus may be readily assembled and disassembled for replacement at a minimum of cost.

With the foregoing objects as paramount, the invention has particular reference to its salient features of construction and arrangement of parts which will become manifest as the description proceeds, taken in connection with the accompanying drawings wherein, Figure 1 is a view in vertical cross section of the preferred form of the invention, Figure 2 is a fragmentary elevational view showing the relationship to Figure 1 by the line 1—1, Figure 3 is an elevational view of one form of the invention, Figure 4 is a fragmentary view of the conveying means for overflow of a modified form of the invention, Figure 5 is a view taken on the line 5—5 on Figure 4, Figure 6 is a fragmentary view in vertical elevation of a still modified form of the conditioning unit, Figure 7 is a view taken on the line 7—7 on Figure 6, Figure 8 is a fragmentary view of another modification of the invention, Figure 9 is a fragmentary view of the speed control mechanism, and, Figure 10 is a view taken on the line 10—10 on Figure 9.

It is common practice in all modern ginning outfits in processing and ginning cotton to take the cotton from the wagon or truck or cotton house by suction, and to pull the cotton by suction into a separator which separates the air from the cotton, the cotton being dropped out of the separator and the air going on through the fan, or in some cases the cotton and air are taken through a fan and the cotton blown into a separator which delivers the cotton into a cleaner and permits the air to go on out of the building.

All of the seed cotton and foreign matter that is picked up by the suction is dropped by the separator into the cleaner and is carried through the cleaner, under the revolving cylinders and over the screen which is under the cotton, in the same volume that comes through the separator.

The cleaner either delivers the cotton into another cleaner or into a master bur extractor so that the seed cotton can be separated from the burs, and then the bur extractor delivers the seed cotton, from which the burs have been separated, into the distributor which delivers the cotton to the feeders. In some cases the arrangement of machinery is such that they do not use an overhead master bur extractor, and in that case the cleaner delivers the cotton and burs directly into the distributor. The distributor delivers the cotton to the feeders which in turn deliver it to the gin stands.

From the above description it will readily be seen that the amount or volume of seed cotton, burs and foreign matter that is handled at any time by the cleaners and master bur extractor is the same volume that is fed into the suction pipe and on through the separator, and is therefore not necessarily in proportion to the volume that is handled by the gin stands, except that it must be more than the gin stands are processing, there being no control of the volume that enters the cleaners and overhead bur extractors for proper processing provided in the ginning system.

This lack of control frequently results in the cleaners and overhead bur extractors having much more volume passed through them during a given period of time than is at all necessary as the gin stands are not separating the lint and seed as fast as it is being put through the overhead equipment.

The present invention contemplates the provision of means whereby the processing of cotton will be much improved by allowing only the amount or volume that is being processed by the gin stands to be handled by the overhead cleaners and master bur extractor. The volume rate is under the control of an operator at all times, and the mechanism is so arranged that the operator can control this rate to effect optimum conditions of flow from his position on the floor in front of the gin stands.

The present invention further contemplates a mechanism whereby the surplus cotton and burs that are fed through the separator will be discharged from the machine on to or into any suitable type of conveyor and delivered to the usual overflow in the gin outfit, or if so desired to some other point to be picked up by a suction line and put back through the device, cleaners and over-head bur machine as required to keep the gin stands running at capacity.

Better processing of cotton is obtained in a cleaner if the cotton is put through it in a controlled volume, than if the volume is greater than necessary as in the case with processing methods heretofore employed. Moreover, any over-head bur extractor will do better extraction and processing if a controlled volume of burs and cotton are fed into it through any given length of time. The present invention contemplates the provision of means to accomplish this result.

Referring primarily to Figures 1, 2 and 3, the reference numeral 1 denotes a chute arranged to direct the unprocessed seed cotton and burs subsequent to their withdrawal from a vehicle by a conventional line, and being separated from the air.

A revolving unit 2, provided with projecting members 2a is operatively rotated in the direction shown. This unit permits cotton and burs falling by gravity from chute 1 to pass by or through it into a hopper 3 when the quantity being processed is less than or equal to the quantity delivered through the chute 1 and further provides a means for ejecting a surplus into a chute or overflow passageway 4 when a surplus is delivered which cannot be properly handled by the overhead cleaners and master bur extractor which process the cotton prior to its delivery to the distributor. The surplus cotton and burs overflowing through the chute 4 are conveyed to an overflow storage (not shown) by a screw or other type conveyor 5. This surplus is subsequently put back through the system whenever desired.

Shafts 6 and 7 are rotated in opposite directions as shown in Figure 1 and serve to support the radially arranged conveying elements 6a and 7a, which elements serve to urge the seed cotton and burs to move into a processing machine 8. This is a conventional cleaner, which cleaner includes a plurality of rotating, spiked cylinders 9 which operate above a foraminous concave 10 in spaced relationship. Foreign matter such as dirt, bur fragments, etc. are thus removed and the conditioned seed cotton subsequently delivered to another cleaner or an overhead bur extractor or a conventional distributor.

Figure 3 is an elevational view of a slight modification of the structure shown in Figure 1. Surplus seed cotton and burs are removed to storage by the conveyor 11 into which conveyor the surplus is delivered by a rotating unit corresponding to the unit 2 shown in Figure 1 and actuated by the driver shaft 12. Driven shafts 13 and 14 serve to support conveying arms corresponding to the arms 6a shown in Figure 1. The seed cotton and burs are then delivered to an overhead type or master bur extractor or to an excess storage bin by actuation of a screw or other type conveyor 15. The reference numeral 12a denotes a conventional cleaner. The control is of conventional design and is shown in detail in Figure 9.

Figures 4 and 5 illustrate a modification of the structure hereinabove described wherein the reference numeral 16 denotes a screw conveyor which serves to convey to a temporary storage the excess seed cotton and burs, the normal quantity being constrained to travel to the processing equipment by the action of the bladed and oppositely rotating units 17 and 18.

Figures 6 and 7 illustrate fragmentarily in cross section a still further modified form of the invention. The reference numeral 19 denotes a receiving chute through which the seed cotton and burs pass downwardly, surplus above that which can be handled by subsequent processing machines being carried to a temporary storage by the screw or other type conveyors 20 and 21, the required flow being controlled as to volume by the oppositely rotating bladed members 22.

Figure 8 illlustrates a still further modification of the invention wherein the surplus flow is divided by a conveyor 16a and transferred to a temporary storage, the seed cotton and burs which may be handled under best operating conditions being urged to the overhead cleaners and or master bur extractor by the bladed rollers 17a at the optimum rate of delivery.

Figures 9 and 10 illustrate one method whereby the flow of seed cotton from the air separator to the overhead cleaners and or master bur extractor may be regulated.

A driver pulley 23 carries a projecting arm or lug 24 to which one end of an arm or link 25 is pivotally connected at 26. The lower end of the arm 25 is pivoted at 27 to a member 28. An arm 29 is pivoted at 30 at its upper end, and is slidably arranged through the member 28.

A set screw 31 serves to secure the member 28 to an arm 32 in adjusted positions, if desired by the operator. An arm 33 formed integral with the arm 32 serves to support a pawl 34 which is arranged to engage a ratchet wheel 35.

A crank 36 when rotated serves to wind a cable 37 upon a drum 38 which action rotates a pulley or drum 39, thereby moving the arm 40 so that the arm 29 is moved to the dotted position illustrated or to any intermediate position. The arm 40 is pivotally connected to a member 41 which latter is arranged to slidably embrace the arm 29. Thus it will be seen that a difference in rate of rotation between the pulley 23 and the ratchet wheel 35 may be effected, since the effective length of the arm 32 may be varied, and consequently a variation in the number of teeth passed over and pulled to a certain position by the pawl will result.

The ratchet wheel 35 serves to drive a gear 42, which gear meshes with a companion gear 43. These gears in turn mesh with the large gears 44 and 45 respectively, which latter serve to rotate bladed feed control members such as shown in Figure 1 and designated by the reference numerals 6 and 6a, and 7 and 7a.

Obviously the flow rate may be varied by other means, such as by changing the spacing between the feed control members without departing from the intent of the invention.

Manifestly, the method and apparatus herein described and illustrated is capable of considerable modification and such modification as is considered within the scope of the appended claims is likewise considered within the spirit and intent of the invention.

What is claimed is:

1. An apparatus for controlling the volume of seed cotton and foreign matter delivered into an over-head cleaner and/or bur extractor in a cotton gin, comprising the combination of a hopper, one or more feeder rollers disposed in the lower end of the hopper and adapted to variable speed for controlling the amount of cotton delivered from the lower or discharge end of the hopper to a cleaner or bur extractor, a deflecting roller disposed in the upper end or mouth of the hopper, a chute adjacent thereto and extending the full width of the machine and connected to the side thereof in position to receive surplus cotton, said upper deflecting roller operating to deflect, throw or spill off surplus cotton through said chute as the cotton in the hopper fills up to said upper deflecting rollers to prevent said surplus cotton from backing up into and choking the separator.

2. An apparatus for controlling the volume of seed cotton and foreign matter delivered into an over-head cleaner and/or bur extractor in a cotton gin outfit, comprising the combination of a hopper for receiving the cotton, one or more feeder rollers disposed in the lower end or outlet of the hopper said feeder rollers being connected to and operated by any suitable variable speed device for regulating the speed as desired to control the amount of cotton passing through the hopper to a cleaner or bur extractor, a deflecting roller disposed in the upper end of the hopper and revolubly operating to deflect and throw cotton accumulated in excess amount in the hopper to one side, and a chute to receive the deflected cotton, said chute extending the full width of the machine and connected to the side thereof in position to receive surplus cotton.

3. An apparatus of the class described and adapted to be utilized as a unit of attachment to a standard ginning outfit, and comprising a hopper, one or more feeder rollers arranged at the lower or discharge end of the hopper, said feeder rollers being connected to and operated by any suitable variable speed device, said lower feeder rollers operating to control the passage or discharge of a predetermined amount of cotton through the hopper, a deflecting roller disposed at the upper end of the hopper, a chute adjacent thereto, said chute extending the full width of the machine and connected to the side thereof for receiving surplus cotton, said upper feeder roller operating to by-pass or knock off the top of such cotton as accumulates in the hopper in excess of the amount normally intended to be discharged from the lower end of the hopper and preventing clogging of the machine or separator delivering cotton to the hopper.

CHARLES G. HUGHES.